(12) United States Patent
Tsai

(10) Patent No.: US 9,957,008 B1
(45) Date of Patent: May 1, 2018

(54) BICYCLE SEATPOST STRUCTURE

(71) Applicant: Taiwan Hodaka Industrial Co., Ltd., Taipei (TW)

(72) Inventor: Black Tsai, Tainan (TW)

(73) Assignee: Taiwan Hodaka Industrial Co., Ltd., Taipei (TW)

( * ) Notice: Subject to any disclaimer, the term of this patent is extended or adjusted under 35 U.S.C. 154(b) by 0 days. days.

(21) Appl. No.: 15/450,075

(22) Filed: Mar. 6, 2017

(51) Int. Cl.
*B62J 1/08* (2006.01)
*B62K 19/36* (2006.01)

(52) U.S. Cl.
CPC ............ *B62J 1/08* (2013.01); *B62J 2001/085* (2013.01)

(58) Field of Classification Search
None
See application file for complete search history.

(56) References Cited

U.S. PATENT DOCUMENTS

| | | | | |
|---|---|---|---|---|
| 5,133,529 A * | 7/1992 | Kashima | ................. | B63B 29/04 248/162.1 |
| 5,460,357 A * | 10/1995 | Stewart | ................. | B62K 25/04 267/141.1 |
| 5,529,327 A * | 6/1996 | Huang | ................. | B62K 25/08 267/141.1 |
| 5,702,093 A * | 12/1997 | Liao | ................. | B62J 1/04 267/132 |
| 5,857,691 A * | 1/1999 | Fan | ................. | B62J 1/06 280/220 |
| 6,220,581 B1 * | 4/2001 | Mueller | ................. | B62K 19/36 267/64.11 |
| 6,270,065 B1 * | 8/2001 | Hals | ................. | B62J 1/04 267/132 |
| 6,364,292 B1 * | 4/2002 | Chen | ................. | B62J 1/02 267/131 |
| 7,845,602 B1 * | 12/2010 | Young | ................. | F16B 7/1409 248/125.8 |
| 8,308,124 B2 * | 11/2012 | Hsu | ................. | B62J 1/08 248/161 |
| 8,328,454 B2 * | 12/2012 | McAndrews | ................. | B62J 1/08 297/215.13 |
| 8,881,875 B2 * | 11/2014 | Buma | ................. | F16F 9/006 188/268 |
| 8,888,115 B2 * | 11/2014 | Chubbuck | ................. | B62K 19/36 267/132 |
| 8,894,025 B2 * | 11/2014 | Wehage | ................. | B62J 1/06 248/157 |
| 8,926,216 B2 * | 1/2015 | McAndrews | ................. | B62J 1/08 403/109.7 |
| 9,073,592 B2 * | 7/2015 | Hsu | ................. | B62J 1/08 |
| 9,126,647 B2 * | 9/2015 | Kuo | ................. | B62J 1/08 |

(Continued)

*Primary Examiner* — Bradley T King
*Assistant Examiner* — James K Hsiao
(74) *Attorney, Agent, or Firm* — Alan D. Kamrath; Kamrath IP Lawfirm, P.A.

(57) ABSTRACT

A bicycle seatpost structure mainly provided with a shock absorber includes a sealed chamber, a buffer element and a gas. The gas is filled in the sealed chamber to change a gas pressure in the sealed chamber. The buffer element is elastic and installed in the sealed chamber for providing an upward elastic support force to an up tube of the seatpost. When a rider sitting on the saddle presses at the saddle, a shock damping force is produced, and the shock damping force and flexibility may be adjusted by the gas pressure and changed anytime according to the rider's body weight or preference.

8 Claims, 4 Drawing Sheets

(56) References Cited

U.S. PATENT DOCUMENTS

| | | | |
|---|---|---|---|
| 9,242,687 B2* | 1/2016 | Lee | B62J 1/00 |
| 9,376,153 B1* | 6/2016 | Kuo | B62J 1/08 |
| 9,688,331 B1* | 6/2017 | Shirai | B62J 1/08 |
| 2004/0070168 A1* | 4/2004 | McKinnon | B62K 19/36 |
| | | | 280/281.1 |
| 2006/0065496 A1* | 3/2006 | Fox | B62K 25/04 |
| | | | 188/275 |
| 2006/0175792 A1* | 8/2006 | Sicz | B62J 1/06 |
| | | | 280/200 |
| 2007/0057420 A1* | 3/2007 | Jordan | B62K 25/08 |
| | | | 267/64.26 |
| 2007/0262501 A1* | 11/2007 | Cheever | B62K 25/08 |
| | | | 267/64.11 |
| 2008/0315552 A1* | 12/2008 | Hsu | B62J 1/04 |
| | | | 280/283 |
| 2010/0199481 A1* | 8/2010 | Petrie | B62J 1/08 |
| | | | 29/428 |
| 2011/0187166 A1* | 8/2011 | Walsh | B62J 1/06 |
| | | | 297/215.13 |
| 2012/0006949 A1* | 1/2012 | Laird | B62J 1/08 |
| | | | 248/161 |
| 2012/0098175 A1* | 4/2012 | Wu | B62J 1/08 |
| | | | 267/132 |
| 2012/0104221 A1* | 5/2012 | Hsu | B62J 1/08 |
| | | | 248/599 |
| 2012/0228906 A1* | 9/2012 | McAndrews | B62J 1/08 |
| | | | 297/215.13 |
| 2012/0247894 A1* | 10/2012 | Shirai | B62K 19/36 |
| | | | 188/322.13 |
| 2013/0093231 A1* | 4/2013 | Hsu | B62J 1/08 |
| | | | 297/344.19 |
| 2013/0119634 A1* | 5/2013 | Camp | B62J 1/08 |
| | | | 280/287 |
| 2013/0221713 A1* | 8/2013 | Pelot | B62J 1/02 |
| | | | 297/215.13 |
| 2013/0307299 A1* | 11/2013 | Winefordner | B62J 1/08 |
| | | | 297/215.13 |
| 2014/0208933 A1* | 7/2014 | Kuo | B62J 1/08 |
| | | | 91/43 |
| 2014/0305253 A1* | 10/2014 | Tseng | B62J 1/06 |
| | | | 74/502.2 |
| 2015/0034779 A1* | 2/2015 | McAndrews | B62J 1/08 |
| | | | 248/125.8 |
| 2015/0232142 A1* | 8/2015 | Shirai | B62J 1/08 |
| | | | 403/104 |
| 2015/0276007 A1* | 10/2015 | Talavasek | B62K 25/20 |
| | | | 188/269 |
| 2015/0300382 A1* | 10/2015 | Kuo | B62J 1/06 |
| | | | 91/45 |
| 2016/0075204 A1* | 3/2016 | Marking | F16F 9/062 |
| | | | 267/225 |
| 2016/0236739 A1* | 8/2016 | Shirai | B62J 1/08 |
| 2016/0355225 A1* | 12/2016 | Shirai | B62J 1/06 |
| 2017/0096185 A1* | 4/2017 | Hara | B62J 1/08 |
| 2017/0197680 A1* | 7/2017 | Feng | B62J 1/08 |
| 2017/0274949 A1* | 9/2017 | Pittens | B62J 1/08 |

\* cited by examiner

BICYCLE SEATPOST STRUCTURE

BACKGROUND OF THE INVENTION

Field of the Invention

The present invention relates to a bicycle seatpost structure, and more particularly to the bicycle seatpost structure providing a shock damping force when a rider sits on a saddle, and the shock damping force and flexibility may be achieved by adjusting a gas pressure in the shock absorber and adjusted according to the rider's body weight or preference for the flexibility of the shock damping force.

Description of the Related Art

In general, a bicycle seatpost protrudes from the top of a frame and is provided for supporting a saddle. The saddle may be adjusted according to a rider's height to make a ride comfortable. Therefore, an elevation device is required to be installed inside the seatpost for adjusting the axial length to provide the rider with an appropriate seat height. In addition, the shock damping force is produced when the rider sits on the saddle, and a spring is generally installed in the seatpost, so that a predetermined pressure support of the spring provides a comfortable damping effect when the rider sits on the saddle. However, the spring constant (K) of the installed spring is fixed, and thus it is necessary to change to a different spring in order to change the spring constant. Since the change of the spring is laborious and it is not easy for a general rider to make such change, the change is generally made by related manufacturers. Therefore, the shock damping force of a bicycle having a spring or any other buffer element for providing a comfortable damping effect to a ride cannot be adjusted flexibly according to the rider's body weight or preference.

SUMMARY OF THE INVENTION

In view of the aforementioned drawbacks of the prior art, the inventor of the present invention based on years of experience in the related industry conducting extensive research and experiments, developed the bicycle seatpost in accordance with the present invention to overcome the drawbacks of the prior art.

Therefore, it is a primary objective of the present invention to provide a bicycle seatpost structure having a saddle with a shock damping force which can be adjusted according to a rider's body weight or preference for the flexibility of the shock damping force.

To achieve the aforementioned and other objectives, the present invention provides a bicycle seatpost comprising a shock absorber installed in an up tube. The shock absorber has a sealed chamber, and the bottom end of the sealed chamber has a spacer, and the spacer is supported by a support end extended into the up tube by a height adjusting device, and the sealed chamber has a buffer element with a bottom end contacted with the spacer and a top end indirectly contacted with the top end of the up tube, and a gas is filled from a gas nozzle into the sealed chamber, so that the sealed chamber has a gas pressure. With the aforementioned devices, when a rider sits on the saddle and the up tube moves axially downward, the bottom end of the buffer element is supported by the spacer and the support end, and the top end of the buffer element moves axially downward with the up tube, so that the buffer element and the gas are compressed simultaneously to provide a shock absorbing effect when the rider sits on the saddle. The pressure of the gas may be adjusted by the gas nozzle, so that the shock damping force and the flexibility of the saddle may be achieved by adjusting the gas pressure in the shock absorber anytime according to the rider's body weight and preference of flexibility.

DETAILED DESCRIPTION OF THE PREFERRED EMBODIMENTS

The technical characteristics, contents, advantages and effects of the present invention will be apparent with the detailed description of a preferred embodiment accompanied with related drawings as follows.

Figure 1:
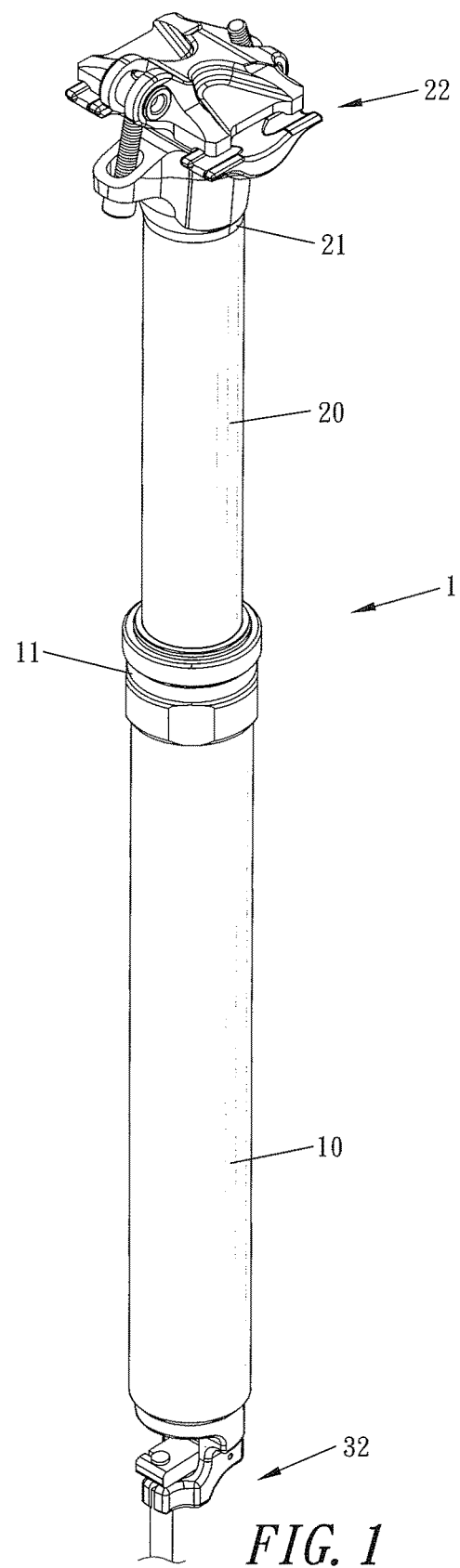
FIG. 1 is a perspective view of a preferred embodiment of the present invention.
Figure 2:
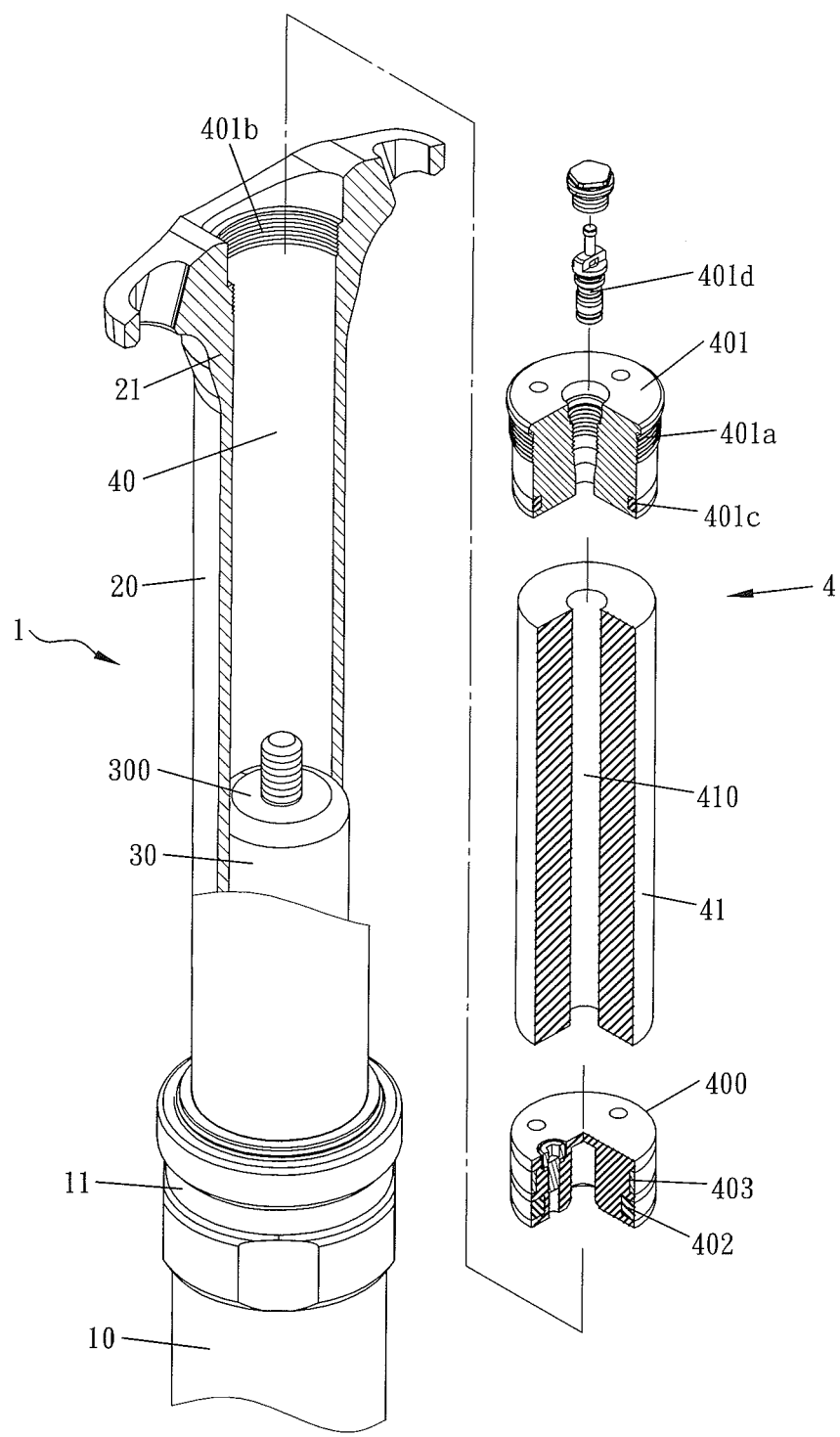
FIG. 2 is a partial cross-sectional exploded view of a preferred embodiment of the present invention.
Figures 3, 4, 5:
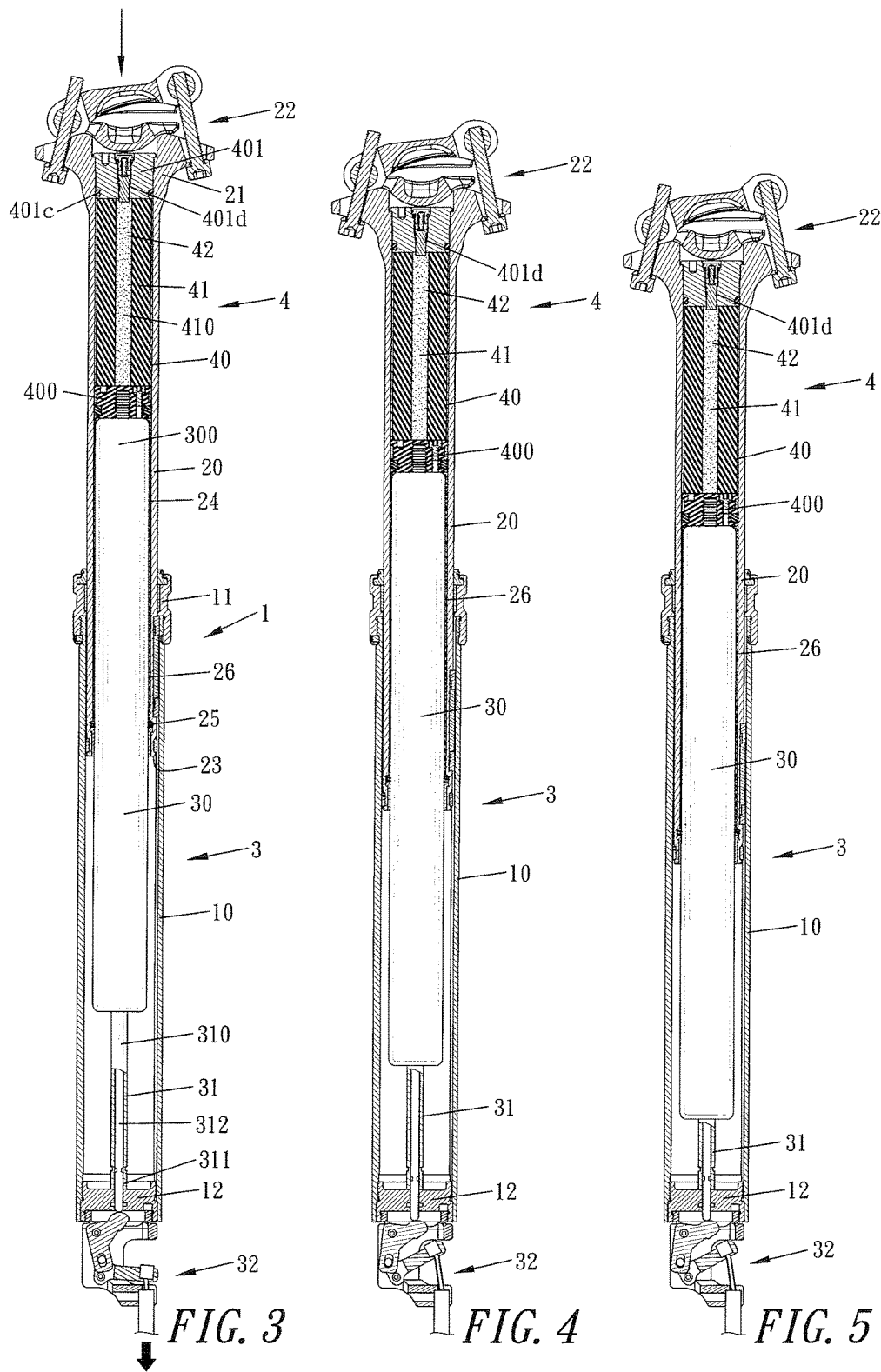
FIG. 3 is a cross-sectional view of a preferred embodiment of the present invention.
FIGS. 4 and 5 are schematic views showing the movement of adjusting a seat height of a preferred embodiment of the present invention.

With reference to FIGS. 1 to 3 for a bicycle seatpost of the present invention, the bicycle seatpost 1 comprises an outer tube 10 and an up tube 20 disposed at the top of the outer tube 10. A position 11 of an outer wall of the outer tube 10 is fixed to a frame of a bicycle. A locking device 22 is installed at a top end 21 of the up tube 20 for connecting a saddle and has a bottom end 23 extended from the top end of the outer tube 10 into the outer tube 10. The seatpost 1 has a height adjusting device 3 installed therein for adjusting the seat height and a shock absorber 4 to provide a shock absorbing effect when the rider sits on the saddle.

With reference to FIGS. 1 and 3 for the height adjusting device 3, the height adjusting device 3 may be a gas pressure rod or a hydraulic rod generally installed in the outer tube 10. The gas pressure rod is used as the height adjusting device in this embodiment and includes a cylinder 30 and a tubular piston rod 31 that can be displaced axially with respect to each other, and a control unit 32. Wherein, the cylinder 30 has a top end 300 (which is a support end) extending into the up tube 20 for indirectly supporting the top end 21 of the up tube 20. The piston rod 31 has a top end 310 extending into the cylinder 30 and a bottom end 311 fixed to a fixed over 12 which is fixed into the outer tube 10, so that the piston rod 31 can be fixed securely. A firing pin 312 is passed into the piston rod 31 and may be pushed by the control unit 32 to open a valve in the cylinder 30, so that the cylinder 30 and the piston rod 31 may be axially displaced with respect to each other, and the height of the up tube 20 may be adjusted with the displacement of the cylinder 30. The control unit 32 is controlled by a control wrench fixed to the bicycle handle.

With reference to FIGS. 1 and 2 for the shock absorber 4, the shock absorber is installed in the up tube 20 and disposed at the top of the height adjusting device 3. With the installation of the shock absorber 4, the cylinder 30 of the height adjusting device 3 has an effect of supporting the up tube 20 and the saddle indirectly. The shock absorber 4 comprises a sealed chamber 40, a buffer element 41 and a gas 42. The sealed chamber 40 is disposed in the up tube 20 and formed and separated by a spacer 400 (which may be a piston) installed at the bottom end, a top cover 401 installed at the top end and an inner wall of the up tube 20. An oil ring 402 and a wear-resisting ring 403 are installed to the outer wall of the spacer 400 and contacted with the inner wall of the up tube 20 for blocking an oil from flowing into the sealed chamber 40 and preventing the spacer 400 and the inner wall of the up tube 20 from rubbing or damaging each other. The bottom end of the spacer 400 is contacted and supported by the top end (support end) of the cylinder 30 of the height adjusting device 3. The outer wall of the top cover 401 is locked and coupled with a serrated surface 401*b* of the inner wall of the up tube 20 by a serrated surface 401*a* as shown in FIGS. 2 and 3, and the outer wall of the top cover 401 has a gas blocking ring 401*c* contacted with the inner wall of the up tube 20 for blocking and preventing the gas from leaking. The top cover 401 has a gas nozzle 401*d* communicated from the exterior of the sealed chamber 40 into the sealed chamber 40 and provided for filling the gas 42 into the sealed chamber 40. The buffer element 41 is made of an elastic material or device (such as an elastic rubber or a compression spring). The buffer element 41 is installed in the sealed chamber 40, and a through hole 410 is axially formed at the middle of the buffer element 41 and has a bottom end contacted with the spacer 400 and a top end contacted with the top cover 401, so that the buffer element 41 provides an elastic support force to the top end 21 of the up tube 20. The gas 42 may be a nitrogen gas filled from the gas nozzle 401*d* into the sealed chamber 40, so that the sealed chamber 40 has a gas pressure.

A gap 24 is formed between the inner wall of the up tube 20 and the outer wall of the cylinder 30 as shown in FIG. 3. The upper end of the gap 24 is isolated by an oil ring 402 of the spacer 400 and the lower end of the gap 24 is blocked by a lower oil ring 25, and the lower oil ring 25 is fixed to an inner wall of the bottom end 23 of the up tube 20, so that the interior of the gap 24 is sealed. An oil 26 is filed into the gap 24, and the top end of the oil 26 has an effect of supporting the bottom end of the spacer 400.

After the aforementioned components are assembled, the bicycle seatpost of the invention is formed as shown in FIGS. 1 and 3. The seat height is adjusted by the height adjusting device 3. The control unit 32 is controlled to push the firing pin 312 upward to open a valve in the cylinder 30, so that the cylinder 30 is displaced axially to move the up tube 20 together with the cylinder 30 in order to adjust the height of the saddle. After the seat height is adjusted, the control unit 32 may be released to fix the seat height. The height is adjusted as shown in FIG. 4 or the seat height may be lowered as shown in FIG. 5.

Figure 6:
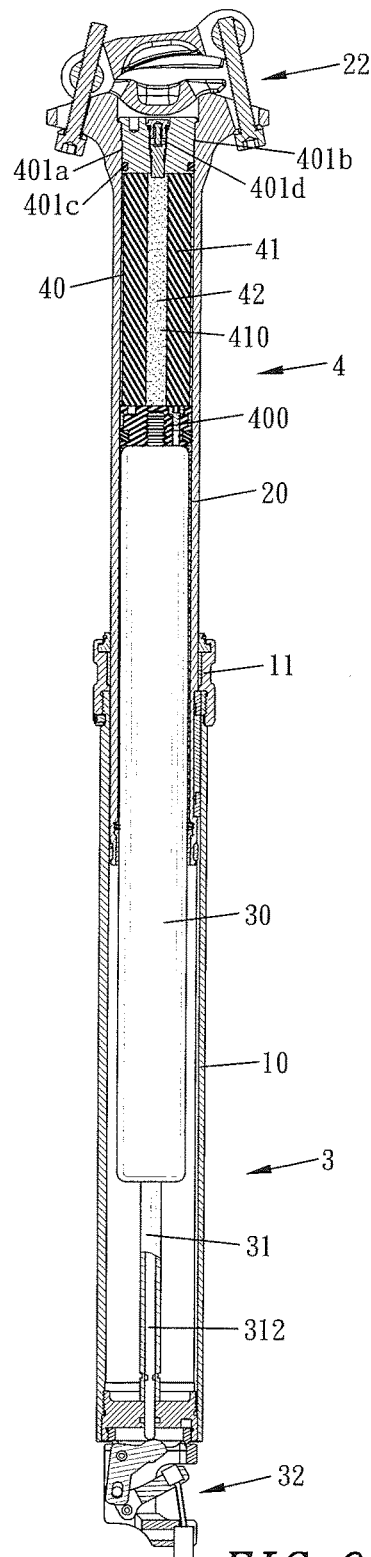
FIGS. 6 and 7 are schematic views showing the movement of absorbing shocks of a preferred embodiment of the present invention.
Figure 7:
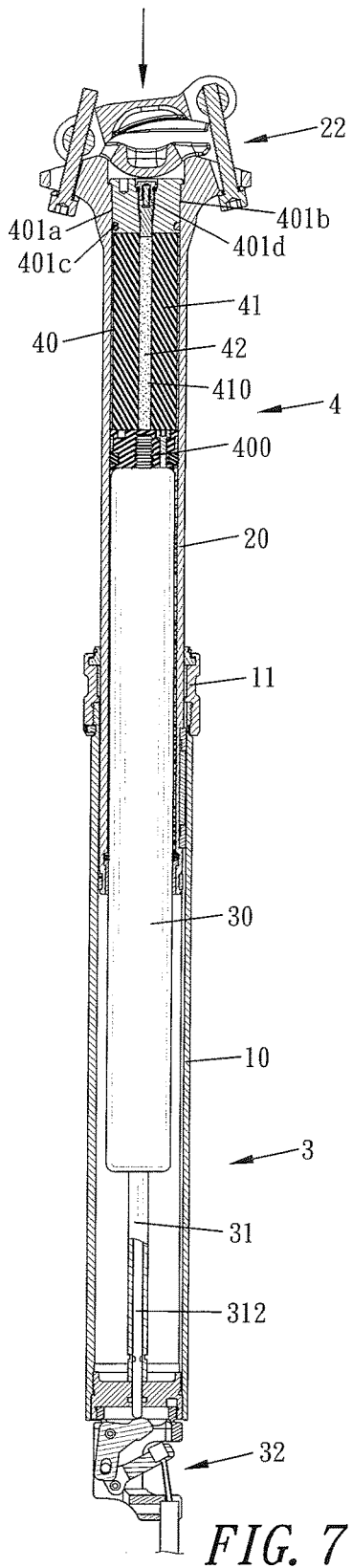

When the rider sits on the saddle (regardless of the saddle being just sat or riding on a bumpy road), the shock absorber 4 provides a shock absorbing effect as shown in FIGS. 6 and 7. When the rider sits on the saddle or rides on a bumpy road, the up tube 20 is pressed and moved axially downward. Now, the top end of the buffer element 41 will be moved downwardly with the up tube 20, compressed and deformed, so that the saddle has a shock absorbing effect as shown in FIG. 7. Since the space in the sealed chamber 40 is reduced with the downward movement of the up tube 20, the gas 42 originally filled into the sealed chamber 40 has a gas pressure, and the magnitude of the gas pressure has an effect of adjusting the shock absorbing stroke and the flexibility of shock absorption. Therefore, the rider may adjust the shock absorbing stroke or the flexibility of the shock absorption by adjusting the quantity of gas filled into the gas nozzle 401*d* and the gas pressure in the sealed chamber 40. In addition, the shock damping force and the flexibility of the saddle may be used to adjust the magnitude of the gas pressure according to the rider's body weight and preference.

In summation of the description above, the present invention complies with the patent application requirements, and thus is duly filed for patent application. While the invention has been described by means of specific embodiments, numerous modifications and variations could be made thereto by those skilled in the art without departing from the scope and spirit of the invention set forth in the claims.

What is claimed is:

1. A bicycle seatpost structure, comprising an outer tube and an up tube disposed at the top of the outer tube; a position of an outer wall of the outer tube being fixed to a frame of the bicycle; the up tube having a top end, and a locking device installed at the top end for coupling a saddle; the up tube having a bottom end extending from a top end of the outer tube into the outer tube; the seatpost having a height adjusting device installed therein, and a shock absorber; the height adjusting device having a support end extending into the up tube for supporting the up tube indirectly; the shock absorber being installed in the up tube and disposed at the top of the height adjusting device, and comprising a sealed chamber, a buffer element and a gas; wherein the sealed chamber is disposed in the up tube and formed and separated by a spacer installed at a bottom end, a top cover installed at a top end, and an inner wall of the up tube; an outer wall of the spacer being contacted with the inner wall of the up tube, and a bottom end of the spacer being contacted with the support end of the height adjusting device; the outer wall of the top cover being fixed to the inner wall of the up tube; a gas nozzle communicated from the outside of the sealed chamber into the sealed chamber for filling the gas into the sealed chamber to change a gas pressure of the sealed chamber; the buffer element being elastic and installed in the sealed chamber, and having a bottom end contacted with the spacer and a top end contacted with the top cover, and the buffer element providing an upward elastic support force to the up tube.

2. The bicycle seatpost structure of claim 1, wherein the spacer has an oil ring and a wear-resisting ring installed to the outer wall of the spacer and contacted with the inner wall of the up tube.

3. The bicycle seatpost structure of claim 2, wherein the outer wall of the top cover has a gas blocking ring contacted and coupled to the inner wall of the up tube.

4. The bicycle seatpost structure of claim 3, wherein the buffer element is an elastic rubber and the middle of the buffer element has an axial through hole.

5. The bicycle seatpost structure of claim 3, wherein the height adjusting device comprises a cylinder, a tubular piston rod, and a control unit, and a top end of the cylinder is the support end extending into the up tube; the piston rod has a top end extending into the cylinder and a bottom end fixed to a fixed cover which is fixed into the outer tube, and a firing pin is passed into the piston rod and may be pushed by the control unit to open a valve in the cylinder, so as to adjust a relative axial displacement between the cylinder and the piston rod.

6. The bicycle seatpost structure of claim 5, further comprising a gap formed between the inner wall of the up tube and the outer wall of the cylinder, and the gap having an upper end isolated by the oil ring and a lower end isolated by a lower oil ring, and the lower oil ring being fixed to an inner wall of the bottom end of the up tube, and an oil being filled into the gap.

7. The bicycle seatpost structure of claim 5, wherein the height adjusting device is a gas pressure rod.

8. The bicycle seatpost structure of claim 5, wherein the height adjusting device is a hydraulic rod.

* * * * *